United States Patent
Kubo et al.

(10) Patent No.: US 7,566,856 B2
(45) Date of Patent: Jul. 28, 2009

(54) IMAGE READING APPARATUS AND CONTROLLING METHOD THEREOF

(75) Inventors: Satoshi Kubo, Ishikawa (JP); Kiyoto Kosaka, Ishikawa (JP)

(73) Assignee: PFU Limited, Ishikawa (JP)

(*) Notice: Subject to any disclaimer, the term of this patent is extended or adjusted under 35 U.S.C. 154(b) by 0 days.

(21) Appl. No.: 12/026,355

(22) Filed: Feb. 5, 2008

(65) Prior Publication Data

US 2008/0315071 A1 Dec. 25, 2008

(30) Foreign Application Priority Data

Jun. 25, 2007 (JP) ............... 2007-166898

(51) Int. Cl.
*G06K 9/20* (2006.01)
*H04N 1/04* (2006.01)
*H04N 1/36* (2006.01)

(52) U.S. Cl. .................... 250/208.1; 250/234; 250/226; 358/509; 358/514

(58) Field of Classification Search .............. 250/208.1, 250/234, 226; 358/475, 482, 483, 494, 496, 358/497, 505, 509, 513, 514
See application file for complete search history.

(56) References Cited

U.S. PATENT DOCUMENTS

| | | | | |
|---|---|---|---|---|
| 4,691,114 A | * | 9/1987 | Hasegawa et al. | 358/474 |
| 5,570,206 A | * | 10/1996 | Yoshinaga | 358/497 |
| 2008/0315071 A1 | * | 12/2008 | Kubo et al. | 250/208.1 |

FOREIGN PATENT DOCUMENTS

JP 2007-097054 A 4/2007

\* cited by examiner

*Primary Examiner*—John R Lee
(74) *Attorney, Agent, or Firm*—Lowe Hauptman Ham & Berner

(57) ABSTRACT

An image reading apparatus includes light sources, an image sensor, a data generating unit, and a carrier unit. The light sources are sequentially turned on for an identical period once in a single line period. The image sensor reads information from a print medium irradiated by the light sources. The data generating unit generates pixel data corresponding to the information. The carrier unit carries the print medium such that the image print medium is scanned by the image sensor in a sub-scanning direction. The single line period is equal to or more than twice a period from when first one of the light sources is turned on until last one of the light sources is turned off.

9 Claims, 11 Drawing Sheets

IMAGE READING APPARATUS AND CONTROLLING METHOD THEREOF

RELATED APPLICATIONS

The present application is based on, and claims priority from, Japan Application Number 2007-166898, filed Jun. 25, 2007, the disclosure of which is hereby incorporated by reference herein in its entirety.

BACKGROUND OF THE INVENTION

1. Field of the Invention

The present invention relates to an image reading apparatus and a controlling method thereof.

2. Description of the Related Art

Japanese Patent Application Laid-open No. 2007-097054 discloses a image reading apparatus that includes a one-line contact image sensor (CIS) and a plurality of light sources, each of which emits one of red light, green light, and blue light. The one-line CIS includes a plurality of image sensing elements such as charged coupled devices (CCDs) that are linearly arranged to form a one-line array. A print medium is read by the image reading apparatus by sequentially turning on the light sources and exposing the image sensing elements to light. Upon being exposed to light, each image sensing element generates R line data corresponding to red light, G line data corresponding to green light, and B line data corresponding to blue light (hereinafter, "RGB line data"). The one-line CIS outputs the RGB line data to a control unit. The control unit first generates RGB pixel data corresponding to each image sensing element based on the RGB line data and then generates RGB read-image data based on the RGB pixel data.

The print medium is carried with respect to the one-line CIS such that the one-line CIS can read the print medium. That is, the print medium is in a moving state while the one-line CIS reads the print medium. Thus, the portion on the print medium facing the one-line CIS during the ON period of each light source is different. That results in a color mismatch between the color of the RGB pixel data and the color of the corresponding portion on the print medium. Hence, color shift of characters or color moire occurs in the RGB read-image data. Particularly in the case of low image reading resolution, the print medium moves faster with respect to the one-line CIS, i.e., the portion on the print medium facing the one-line CIS becomes largely-spaced thereby making the color shift more prominent.

Such color shift in the RGB read-image data can be suppressed by linearly arranging the image sensing elements to form a three-line array. However, a three-line array arrangement of the image sensing elements is expensive as compared to a one-line array arrangement. That results in high manufacturing cost for the image reading apparatus.

The color shift can also be suppressed by configuring the image reading apparatus to read the print medium at a reading resolution higher than a specified reading resolution, generate RGB read-image data corresponding to the higher reading resolution, and then correct the generated RGB read-image data to RGB read-image data corresponding to the specified reading resolution. However, while reading the image print at a higher reading resolution, the carrying speed of the print medium with respect to the one-line CIS slows down than in the case of reading the image print at the specified reading resolution.

SUMMARY OF THE INVENTION

It is an object of the present invention to at least partially solve the problems in the conventional technology.

According to an aspect of the present invention, there is provided an image reading apparatus that includes a light source unit, a sensor, a generating unit, and a carrier unit. The light source unit includes a plurality of light sources each corresponding to a different color. The light sources are sequentially turned on once in a single line period to emit light of corresponding colors to irradiate a print medium with the light. The sensor includes an array of image sensing elements that read information from the print medium irradiated with the light to generate element data. The generating unit generates, based on the element data, first pixel data corresponding to the information. The carrier unit carries the print medium with respect to the sensor to allow the sensor to read the information from the print medium in a sub-scanning direction. The single line period is equal to or more than twice a period from when first one of the light sources is turned on until last one of the light sources is turned off.

According to another aspect of the present invention, there is provided a method of controlling an image reading apparatus. The method includes sequentially turning on a plurality of light sources, each corresponding to a different color, once in a single line period to emit light of corresponding colors to irradiate a print medium with the light; reading information from the print medium irradiated with the light to generate element data by a sensor that includes an array of image sensing elements; generating, based on the element data, first pixel data corresponding to the information; and carrying the print medium with respect to the sensor to allow the sensor to read the information from the print medium in a sub-scanning direction. The single line period is equal to or more than twice a period from when first one of the light sources is turned on until last one of the light sources is turned off.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. Although an image reading apparatus is described below as an image scanner, any other apparatus, such as a multifunction product (MFP), a facsimile machine, or a character recognizing device, can be used in which a print medium is scanned by using an image sensor. Specifically, an image scanner of auto document feeder type is explained below, by way of example only, in which a print medium is carried with respect to an image sensor for image scanning. However, the image scanner can also be a flathead type scanner.

Figure 1:
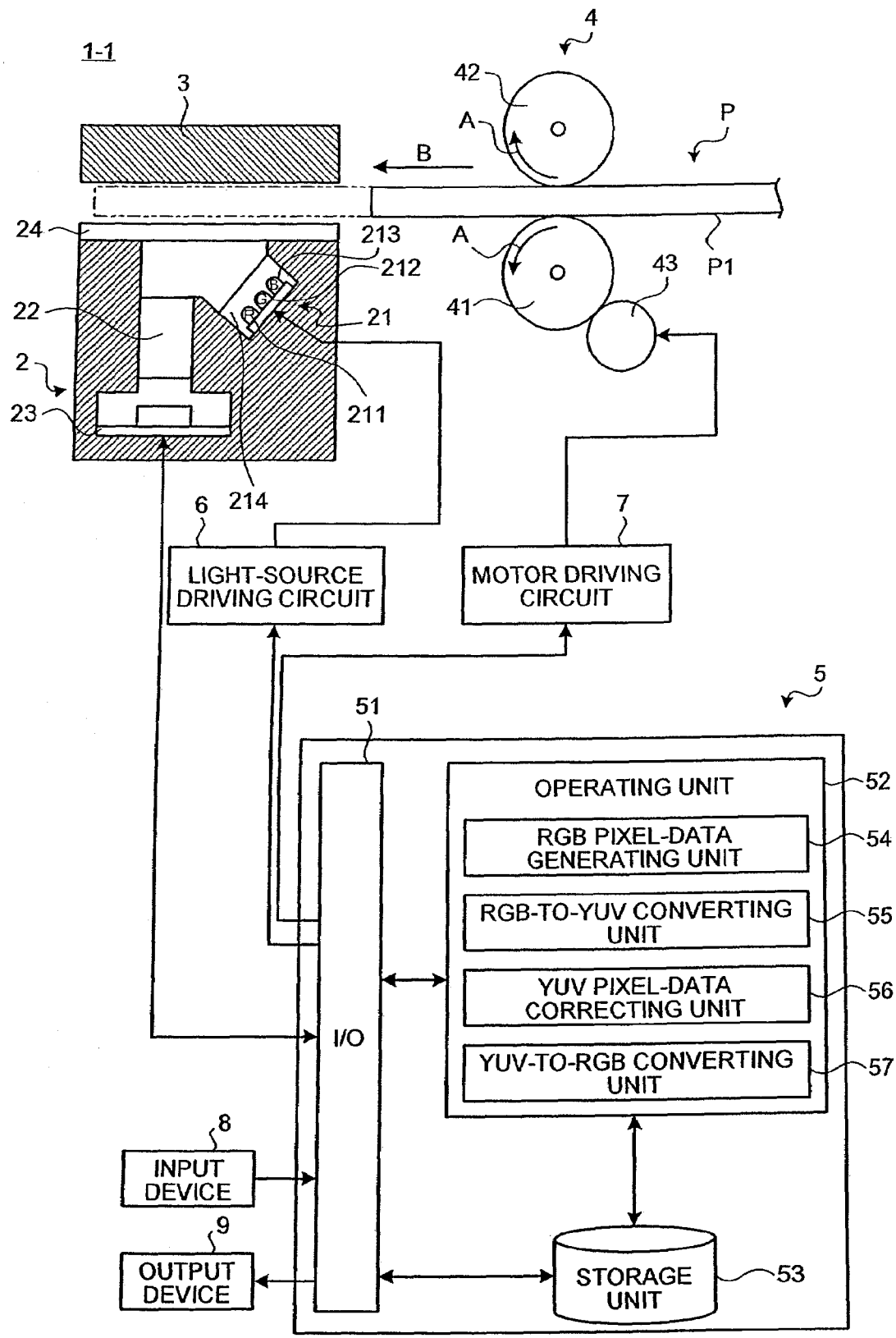
FIG. 1 is a schematic diagram of an image scanner according to a first embodiment of the present invention.

FIG. 1 is a schematic diagram of an image scanner 1-1 as an image reading apparatus according to a first embodiment of the present invention. The image scanner 1-1 includes an image sensor 2, a backing member 3, a carrier unit 4, a control unit 5, a light-source driving circuit 6, and a motor driving circuit 7. An input device 8 and an output device 9 are connected to the image scanner 1-1. The image sensor 2 includes a light source unit 21 that in turn includes a red (R) light source 211, a green (G) light source 212, and a blue (B) light source 213 (hereinafter, "RGB light sources 211 to 213"), each of which is separately turned on and off by the light-source driving circuit 6. The carrier unit 4 includes a motor 43 that is driven by the motor driving circuit 7.

The carrier unit 4 carries a print medium (sheet P) with respect to the image sensor 2. The image sensor 2 scans a printed surface P1 of the sheet P in a main scanning direction (vertical direction in FIG. 1). The image sensor 2 is arranged in a housing (not shown) of the image scanner 1-1, and includes the light source unit 21, a lens 22, and an image sensor 23. A transmissive supporting member 24 is an optically transmissive material such as a glass plate that along with the backing member 3 supports the sheet P carried by the carrier unit 4.

The light source unit 21 irradiates the sheet P with the light emitted by the RGB light sources 211 to 213. In addition to the RGB light sources 211 to 213, the light source unit 21 also includes a prism 214. When turned on, the R light source 211 emits red light, the G light source 212 emits green light, and the B light source 213 emits blue light. Each of the RGB light sources 211 to 213 is made of a light emitting diode (LED) and is separately turned on and off by the light-source driving circuit 6. The light-source driving circuit 6 is connected to and controlled by the control unit 5. The control unit 5 controls the light-source driving circuit 6 to separately and sequentially turn on each of the RGB light sources 211 to 213 for one controlling period. For example, during a first controlling period, the control unit 5 controls the light-source driving circuit 6 to turn on the R light source 211. During a second controlling period, the control unit 5 controls the light-source driving circuit 6 to first turn on the R light source 211 and then turn on the G light source 212. Similarly, during a third controlling period, the control unit 5 controls the light-source driving circuit 6 to first turn on the G light source 212 and then turn on the B light source 213. Thus, each of the RGB light sources 211 to 213 is turned on for one controlling period and the ON period for each of the RGB light sources 211 to 213 is equal or almost equal. Meanwhile, a single line period includes more than six controlling periods, i.e., more than twice the total period for which each of the RGB light sources 211 to 213 is sequentially turned on and off once. The control unit 5 makes each of the RGB light sources 211 to 213 to turn on and off once within a single line period, which depends on the scanning resolution of the image scanner 1-1 when scanning the sheet P. The prism 214 is used to uniformly irradiate the printed surface P1 facing the image sensor 2 with the light emitted by each of the RGB light sources 211 to 213 in the main scanning direction. That is, the light emitted by each of the RGB light sources 211 to 213 passes through the prism 214 and the transmissive supporting member 24, and falls onto the printed surface P1 in the main scanning direction.

After irradiating the printed surface P1, the light reflects from the printed surface P1, passes through the lens 22, and falls onto the image sensor 23. The lens 22 is made of, e.g., a rod lens array. When the reflected light passes through the lens 22, an upright image of the printed surface P1 is formed on a line sensor (not shown) of the image sensor 23 at same magnification. The lens 22 is arranged between the image sensor 23 and the transmissive supporting member 24.

The image sensor 23 includes a plurality of image sensing elements (not shown) that are linearly arranged in the main scanning direction to form a one-line array. When exposed to light, each image sensing element generates element data depending on the light that falls thereon through the lens 22. The image sensor 23 then generates line data from the element data generated by each image sensing element. In this way, the one-line array of the image sensing elements in the image sensor 23 scan the printed surface P1 in the main scanning direction.

The image sensor 23 is connected to and controlled by the control unit 5. The control unit 5 exposes the image sensing elements to light at the same time of turning on each of the RGB light sources 211 to 213. That is, the control unit 5 exposes the image sensing elements to light during each controlling period in which one of the RGB light sources 211 to 213 is turned on. Thus, the image sensing elements can generate element data corresponding to red light, green light, and blue light sequentially emitted by the RGB light sources 211 to 213. The element data corresponding to red light is referred to as R data, the element data corresponding to green light is referred to as G data, and the element data corresponding to blue light is referred to as B data (hereinafter, "RGB data"). Consequently, the image sensor 23 generates the line data, viz., R line data, G line data, and B line data (hereinafter, "RGB line data") from the R data, the G data, and the B data, respectively. The image sensor 23 outputs the RGB line data to the control unit 5.

The backing member 3 and the transmissive supporting member 24 support the sheet P. The backing member 3 is arranged facing the image sensor 2 such that the sheet P is sandwiched therebetween. The surface of the backing member 3 facing the image sensor 2 is made of a white material.

The carrier unit 4 carries the sheet P with respect to the image sensor 2 to a position facing the image sensor 2, i.e., to a position between the backing member 3 and the image sensor 2 such that the printed surface P1 is facing the image sensor 23. The carrier unit 4 includes two rotatably supported carrier rollers 41 and 42, and the motor 43 that rotates the carrier roller 41. On rotation of the motor 43, the carrier roller 41 rotates in the direction indicated by an arrow A in FIG. 1. When the carrier roller 41 rotates, the sheet P is carried from between the carrier rollers 41 and 42 in the direction indicated by an arrow B (sub-scanning direction) in FIG. 1 to a position facing the image sensor 2. While the sheet P is being placed at a position facing the image sensor 2, the image sensor 23 repeats scanning in the main scanning direction such that the printed surface P1 is scanned in the sub-scanning direction. The motor driving circuit 7 that drives the motor 43 is connected to the control unit 5. Thus, eventually, the control unit 5 controls the carrier unit 4 to carry the sheet P. More particularly, the control unit 5 controls the carrying speed at which the carrier unit 4 carries the sheet P based on the scanning resolution of the image scanner 1-1 when scanning the sheet P.

The control unit 5 controls the scanning of the printed surface P1 and generates RGB scanned-image data corresponding to the printed surface P1. The control unit 5 includes an input-output (I/O) unit 51, an operating unit 52, and a storage unit 53 that are connected to each other. The control unit 5 is connected to the input device 8 and the output device 9 via the I/O unit 51. Various types of instructions or data can be input by using the input device. The instructions can be, e.g., an instruction to start scanning the sheet P or a control instruction for setting the scanning resolution for scanning the sheet P. The input device 8 can be a switch, a keyboard, a mouse, or a microphone.

The operating unit 52 is configured by assembling a memory (not shown) such as a random access memory (RAM) or a read only memory (ROM) and a central processing unit (CPU) (not shown), and includes an RGB pixel-data generating unit 54, an RGB-to-YUV converting unit 55, a YUV pixel-data correcting unit 56, and a YUV-to-RGB converting unit 57. When the image sensor 23 starts scanning the sheet P, the operating unit 52 loads into the memory a control program for the image scanner 1-1 and executes the control program. The operating unit 52 stores in the storage unit 53 numerical values generated during the execution of the control program and uses the values for further operations.

The RGB pixel-data generating unit 54 generates reference RGB pixel data (color data) corresponding to the sheet P. That is, the RGB pixel-data generating unit 54 generates the reference RGB pixel data from the RGB data generated by each image sensing element.

The RGB-to-YUV converting unit 55 converts the reference RGB pixel data into luminance pixel data that has a luminance component and a color component. The luminance pixel data according to the first embodiment is assumed to be YUV pixel data (where Y represents a luminance component, while U and V stand represent a color component). Based on the RGB data in the reference RGB pixel data, the RGB-to-YUV converting unit 55 generates Y component data regarding the luminance component, and U component data and V component data regarding the color component to generate the YUV pixel data.

The YUV pixel-data correcting unit 56 corrects the YUV pixel data based on at least one of the luminance component and the color component to generate corrected YUV pixel data. In the case of correcting the YUV pixel data by smoothing the color component (color smoothing), the YUV pixel-data correcting unit 56 performs smoothing of a U component and a V component in the sub-scanning direction based on adjacent U components and V components, respectively. For example, a U component $U_n$ and a V component $V_n$ can be smoothed based on adjacent U components $U_{n-1}$ and $(U_{n+1})$, and V components $V_{n-1}$ and $V_{n+1}$, respectively, by using Expression (1) and (2) as follows:

$$U_n = (d1 \times U_{n-1} + d2 \times U_n + d3 \times U_{n+1})/(d1+d2+d3) \quad (1)$$

$$V_n = (e1 \times V_{n-1} + e2 \times V_n + e3 \times V_{n+1})/(e1+e2+e3) \quad (2)$$

where d1, d2, and d3 are weight parameters for the U component data, while e1, e2, and e3 are weight parameters for the V component data.

The YUV-to-RGB converting unit 57 converts the corrected YUV pixel data into post-correction RGB pixel data based on the Y component data, the U component data, and the V component data. The control unit 5 generates the RGB scanned-image data based on the post-correction RGB pixel data.

The operating unit 52 displays the RGB scanned-image data on the output device 9. The output device 9 can be a cathode ray tube (CRT) device or a liquid crystal display (LCD) device. The displayed RGB scanned-image data can be sent to a printer (not shown) for printing. Meanwhile, the storage unit 53 can be housed in the operating unit 52 or an external device such a data base server. Moreover, the input device 8 and the output device 9 can be mounted on the image scanner 1-1. If the image scanner 1-1 is a part of a computer system, the input device 8 and the output device 9 can be mounted on a terminal device of the computer system, and can be configured to access the image scanner 1-1 by using a wired connection or a wireless connection.

The storage unit 53 stores therein the control program for the image scanner 1-1. The storage unit 53 can be a fixed disk drive such as a hard disk drive (HDD), a flexible disk, a magnetic-optical disk, a non-volatile memory such as a flash memory, or a volatile memory such as a RAM. The storage unit 53 can also be a storage mechanism including a combination of the abovementioned storage units.

The control program need not be an independent program and can be executed along with other computer programs such as an operating system (OS) of a computer system. Moreover, the control program can be stored in a storage medium, and a computer system can be configured to load therein and execute the control program such that the image scanner 1-1 scans the sheet P. The computer system referred to herein includes software such as the OS as well as hardware such as peripheral devices.

Figure 2:
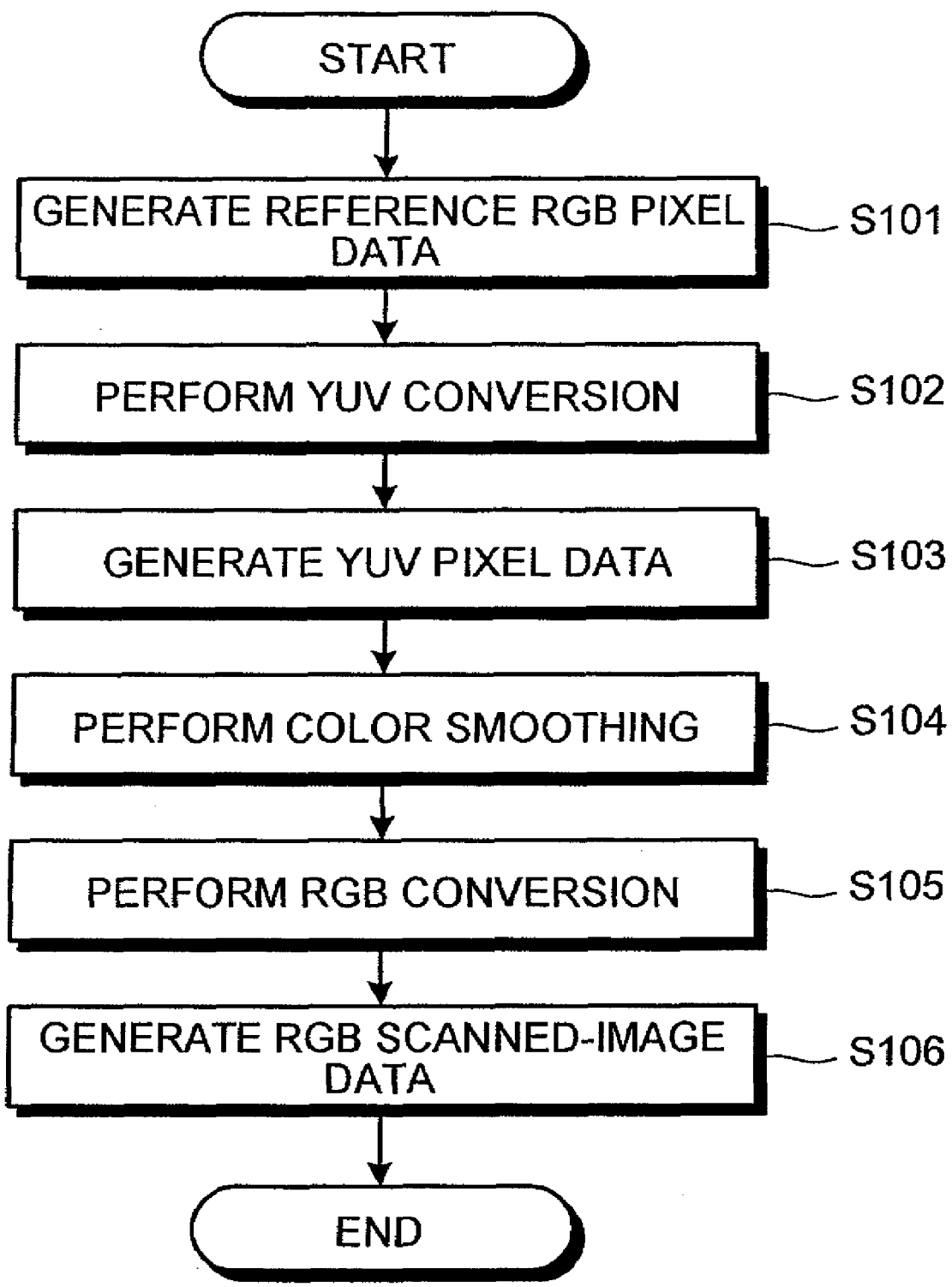
FIG. 2 is a flowchart of the operation of the image scanner shown in FIG. 1.

FIG. 2 is a flowchart of the process of generating RGB scanned-image data through color smoothing.

As described above, while scanning the printed surface of a sheet, the image sensor 23 outputs to the control unit 5 RGB line data for each line period. Based on post-correction RGB pixel data generated by the YUV-to-RGB converting unit 57, the control unit 5 then generates RGB scanned-image data corresponding to the printed surface. Upon starting scanning the printed surface, the control unit 5 sends a synchronization signal to the image sensor 23. The control unit 5 then controls the carrier unit 4 to carry the sheet towards the image sensor 23 at a speed that depends on the scanning resolution set in advance by using the input device 8. For example, if a low scanning resolution is set, the control unit 5 controls the carrier unit 4 to carry sheets at a faster speed than in the case of a high scanning resolution. As a result, the printed surfaces of the sheets facing the image sensor 23 are largely-spaced during each line period.

First, while a sheet is being carried by the carrier unit 4 with respect to the image sensor 23, the RGB pixel-data generating unit 54 generates reference RGB pixel data corresponding to the image sensing elements during each line period (step S101). The reference RGB pixel data is based on RGB line data. The RGB pixel-data generating unit 54 repeats generating reference RGB pixel data until the scanning of the printed surface of the sheet is complete. That is, the image sensor 23 repeats scanning in the main scanning direction such that the printed surface is scanned in the sub-scanning direction and the RGB pixel-data generating unit 54 generates reference RGB pixel data corresponding to the scanned information of the printed surface during each line period.

Figure 3:
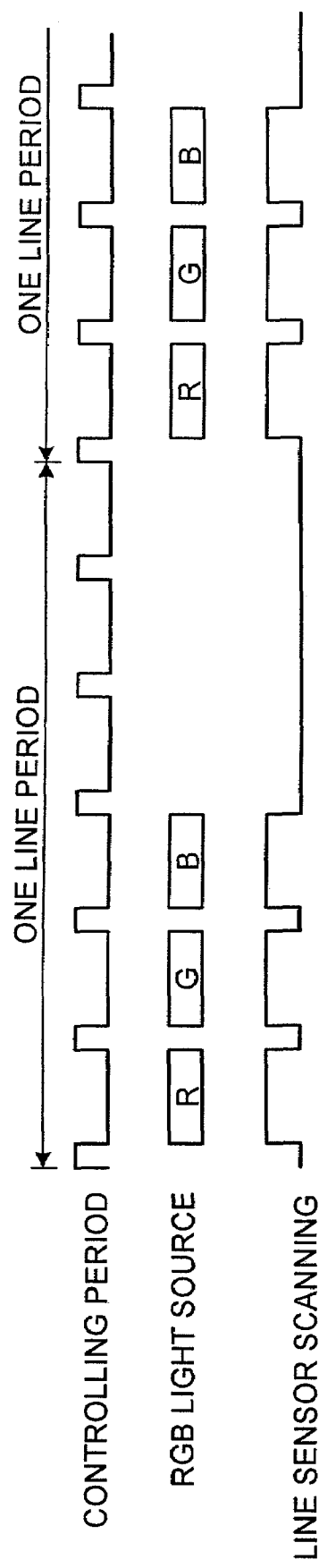
FIG. 3 is a timing chart for explaining the operation of each light source and an image sensor shown in FIG. 1.

As described above, a single line period is assumed to be more than twice the period for which each of the RGB light sources 211 to 213 to be turned on and off once. Within each line period, the control unit 5 controls the light-source driving circuit 6 to separately and sequentially turn on each of the RGB light sources 211 to 213 for one controlling period. The image sensor 23 scans the printed surface while each of the RGB light sources 211 to 213 is turned on within each line period. FIG. 3 is a timing chart for explaining the operation of the RGB light sources 211 to 213 and the image sensor 23. As shown in FIG. 3, a single line period is equal to six controlling periods, i.e., equal to twice the period for which each of the RGB light sources 211 to 213 is turned on and off once. During a first controlling period, the control unit 5 controls the light-source driving circuit 6 to turn on the R light source 211 and at the same time exposes the image sensing elements in the image sensor 23 to light such that the image sensor 23 can generate the R line data that includes the R data for one-sixth of a single line period. The image sensor 23 outputs the R line data to the control unit 5. During a second controlling period, the control unit 5 controls the light-source driving circuit 6 to turn on the G light source 212 and at the same time re-exposes the image sensing elements in the image sensor 23 to light such that the image sensor 23 can generate the G line data that includes the G data for one-sixth of a single line period. The image sensor 23 outputs the G line data to the control unit 5. Similarly, during a third controlling period, the control unit 5 controls the light-source driving circuit 6 to turn on the B light source 213 and at the same time re-exposes the image sensing elements in the image sensor 23 to light such that the image sensor 23 can generate the B line data that includes the B data for one-sixth of a single line period. The image sensor 23 outputs the B line data to the control unit 5.

Thus, to sum up, within a single line period, the control unit 5 controls the light-source driving circuit 6 to turn on each of the RGB light sources 211 to 213 for a total of half of the single line period. Naturally, the total ON period of the RGB light sources 211 to 213 is always less than a single line period. Moreover, within a single line period, the RGB pixel-data generating unit 54 generates the reference RGB pixel data corresponding to the scanned information of the printed surface P1 that is placed above the image sensor 23 only for a period equal to half of the single line period. In the case of the RGB light sources 211 to 213 being turned on for a period equal to half of a single line period as described above, the distance by which the carrier unit 4 further carries the sheet P (i.e., the amount of shift in the printed surface P1 facing the image sensor 23) is smaller than when the case of the RGB light sources 211 to 213 are turned on for one complete line period. Such a configuration can prevent color mismatch between the original color on the printed surface P1 and the color of the reference RGB pixel data. Consequently, it is possible to suppress color non-uniformity in the RGB scanned-image data, which is generated after correcting the reference RGB pixel data to post-correction RGB pixel data. More particularly, it is possible to suppress color shift of black-and-white characters on a document or color moire in a black-and-white halftone document.

As described above, only a one-line array of the image sensing elements in the image sensor 23 is sufficient for suppressing the color non-uniformity. Such an arrangement is cost effective as compared to a three-line array of image sensing elements. Moreover, because the color non-uniformity can be suppressed without varying the carrying speed of a sheet with respect to the image sensor 23, it is possible to save the time required for generating the RGB scanned-image data.

After the RGB pixel-data generating unit 54 generates the reference RGB pixel data (step S101), the RGB-to-YUV converting unit 55 performs YUV conversion of the reference RGB pixel data (step S102) to generate YUV pixel data (step S103).

The YUV pixel-data correcting unit 56 smoothes the color components of the YUV pixel data to generate corrected YUV pixel data (step S104). More particularly, the YUV pixel-data correcting unit 56 performs smoothing of a U component and a V component in the YUV pixel data based on adjacent U components and V components, respectively, in the sub-scanning direction.

The YUV-to-RGB converting unit 57 performs RGB conversion of the corrected YUV pixel data to generate post-correction RGB pixel data (step S105). Based on the post-correction RGB pixel data, the control unit 5 generates RGB scanned-image data (step S106).

Thus, the post-correction RGB pixel data is generated after performing color smoothing, which results in suppression of color shift or color moire in the post-correction RGB pixel data. Consequently, because the RGB scanned-image data is generated based on the post-correction RGB pixel data, color non-uniformity in the RGB scanned-image data can also be reduced.

Meanwhile, the data correction for suppressing color non-uniformity is not limited to color smoothing. That is, color non-uniformity can also be suppressed by performing color-component curve correction as described below with reference to FIGS. 4 and 5, or luminance smoothing as described below with reference to FIG. 6.

Given below is the description of color-component curve correction. For example, the YUV pixel-data correcting unit 56 can be configured to correct the YUV pixel data in such a manner that color component data having a smaller color value is corrected to have a still smaller color value. More particularly, the YUV pixel-data correcting unit 56 can be configured to correct a portion in the YUV pixel data with less color saturation, i.e., to correct U component data and V component having a smaller color value to have a still smaller color value. A portion with less color saturation is formed in the YUV pixel data due to noise generated when the ON period of the RGB light sources 211 to 213 within a single line period is shortened.

Figure 4:
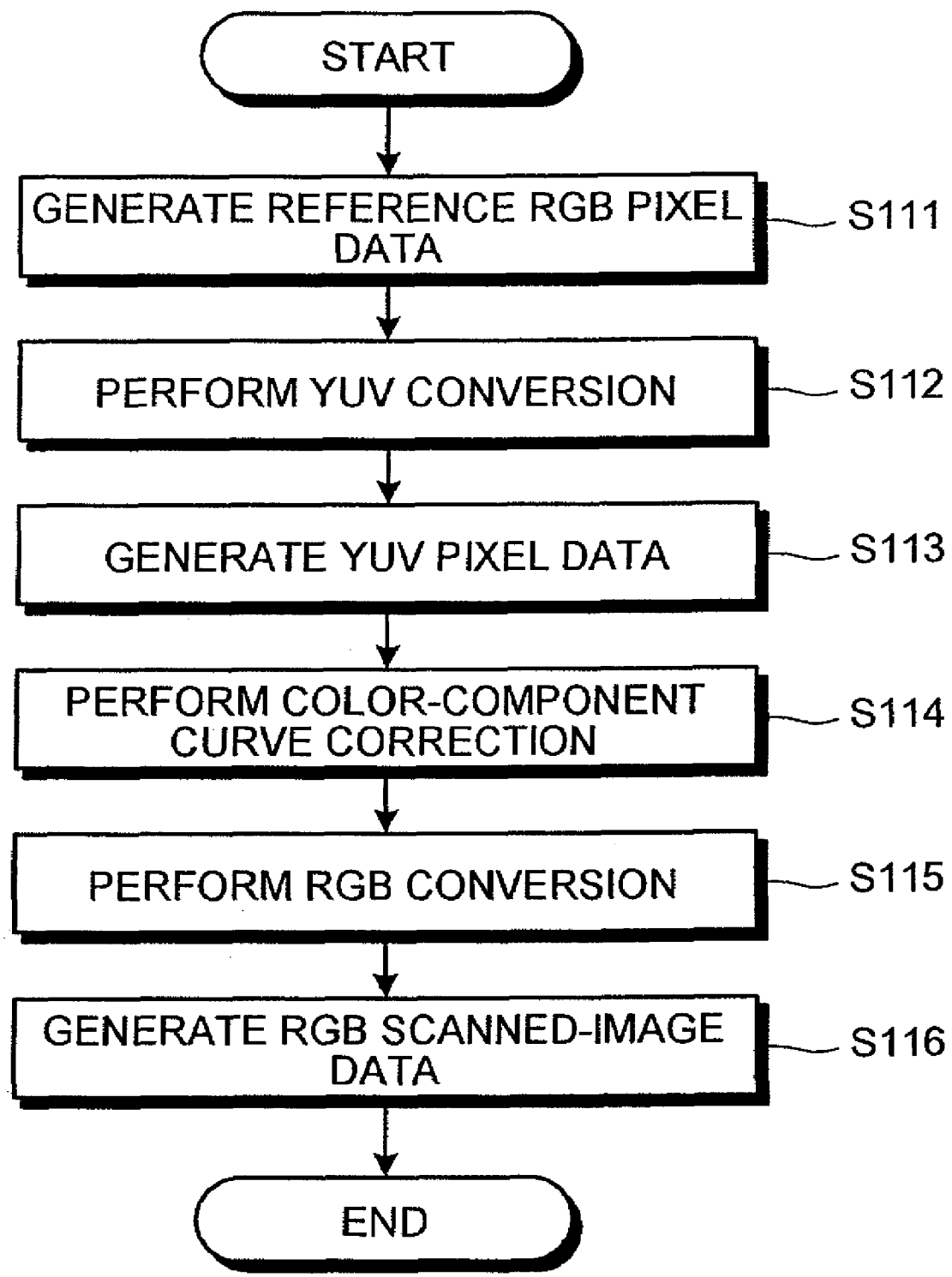
FIG. 4 is another flowchart of the operation of the image scanner shown in FIG. 1.
Figure 5:
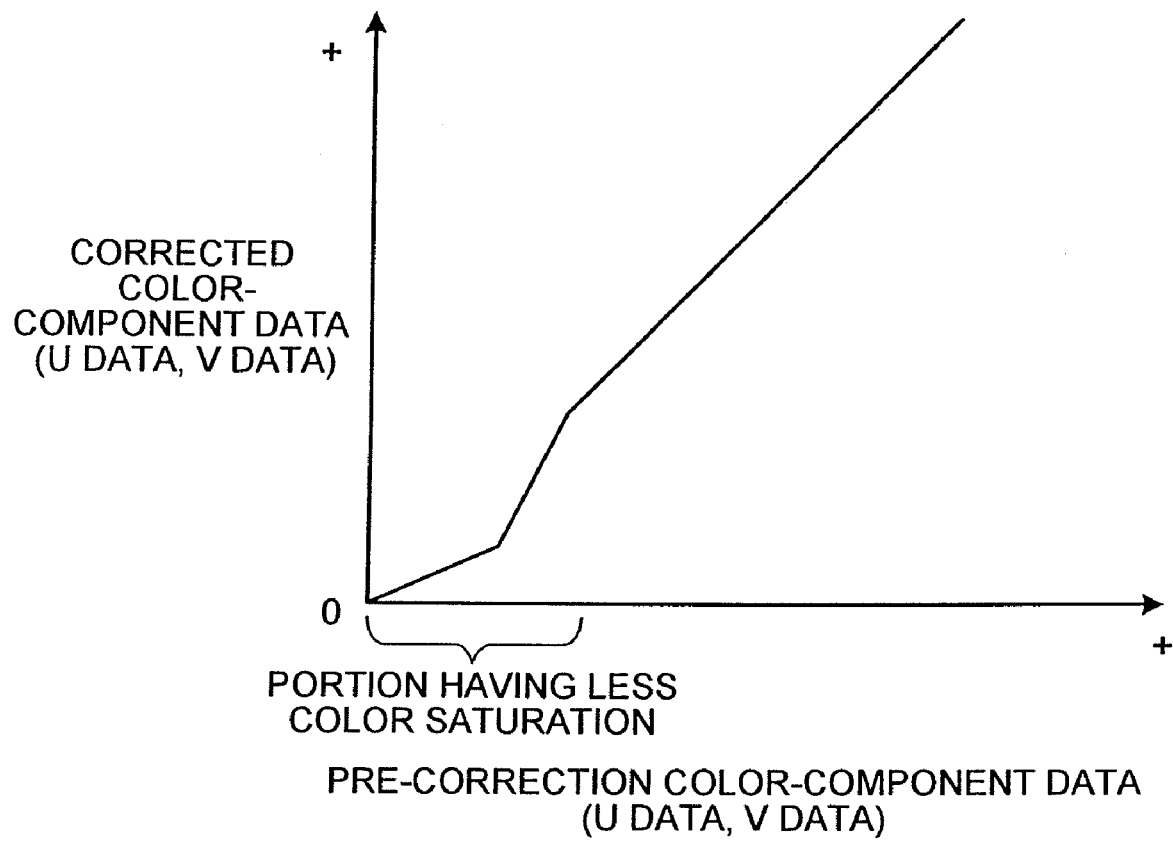
FIG. 5 is a chart for explaining a color component curve.

FIG. 4 is a flowchart of the process of generating RGB scanned-image data through color-component curve correction. FIG. 5 is a chart for explaining a color component curve. As shown in FIG. 4, first, the RGB pixel-data generating unit 54 generates reference RGB pixel data (step S111). The RGB-to-YUV converting unit 55 performs YUV conversion of the reference RGB pixel data (step S112) to generate YUV pixel data (step S113). The YUV pixel-data correcting unit 56 performs a color-component curve correction of the U component data and the V component data by using the color component curve shown in FIG. 5 to generate corrected YUV pixel data (step S114). The color component curve enables calculation of corrected U component data and corrected V component data (hereinafter, "corrected color-component data") corresponding to the pre-correction U component data and the pre-correction V component data, respectively, (hereinafter, "pre-correction color-component data"). The color component curve is configured to output corrected color-component data having a smaller color value than that of pre-correction color-component data when the pre-correction color-component data corresponds to a portion having less color saturation.

After the YUV pixel-data correcting unit 56 performs color-component curve correction of the YUV pixel data (step S114), the YUV-to-RGB converting unit 57 converts the corrected YUV pixel data into post-correction RGB pixel data (step S115). Based on the post-correction RGB pixel data, the control unit 5 generates RGB scanned-image data (step S116).

Thus, the post-correction RGB pixel data is generated by color-component curve correction of the YUV pixel data. As a result, color moire in the post-correction RGB pixel data can be suppressed along with the noise, which is generated by shortening the ON period of the RGB light sources 211 to 213. Consequently, because the RGB scanned-image data is generated based on the post-correction RGB pixel data, color non-uniformity in the RGB scanned-image data can also be reduced.

Given below is the description of luminance smoothing. For example, the YUV pixel-data correcting unit 56 can be configured to correct the Y component data (luminance component data) of YUV pixel data.

Figure 6:
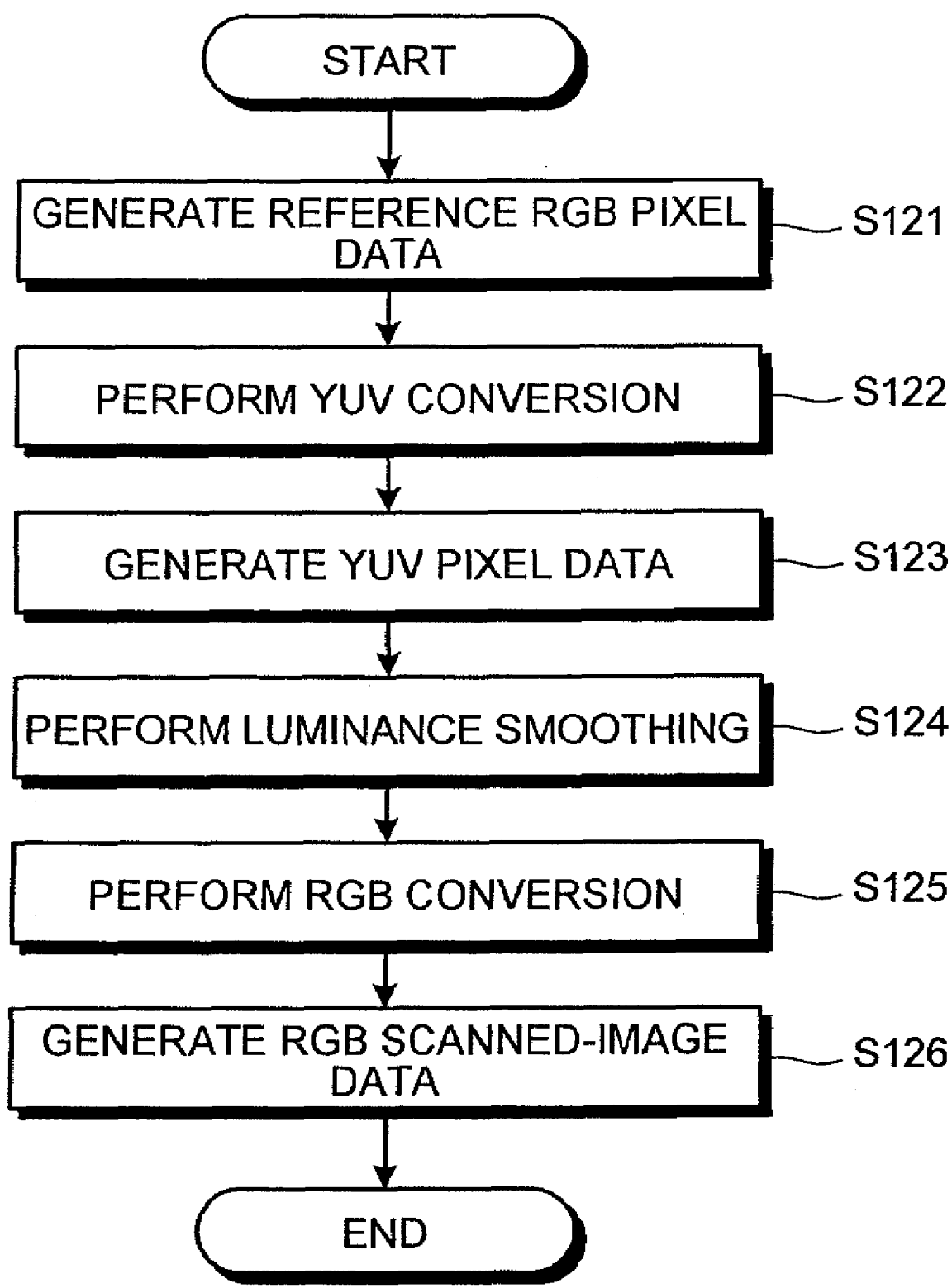
FIG. 6 is still another flowchart of the operation of the image scanner shown in FIG. 1.

FIG. 6 is a flowchart of the process of generating the RGB scanned-image data by performing luminance smoothing. As shown in FIG. 6, first, the RGB pixel-data generating unit 54 generates reference RGB pixel data (step S121). The RGB-to-YUV converting unit 55 performs YUV conversion of the reference RGB pixel data (step S123). The YUV pixel-data correcting unit 56 smoothes the luminance components of the YUV pixel data to generate corrected YUV pixel data (step S124). More particularly, the YUV pixel-data correcting unit 56 performs smoothing of the Y component data in the YUV pixel data by performing two-dimensional Gaussian filtering.

The YUV-to-RGB converting unit 57 converts the corrected YUV pixel data into post-correction RGB pixel data (step S125). Based on the post-correction RGB pixel data, the control unit 5 generates RGB scanned-image data (step S126).

Thus, the post-correction RGB pixel data is generated by luminance smoothing, which results in suppression of color shift or color moire in the post-correction RGB pixel data. Consequently, because the RGB scanned-image data is generated based on the post-correction RGB pixel data, color non-uniformity in the RGB scanned-image data is also suppressed.

Meanwhile, the YUV pixel-data correcting unit 56 can also be configured to perform a combination of color smoothing, color-component curve correction, and luminance smoothing.

Moreover, instead of the YUV pixel data, any other type of pixel data having a luminance component and a color component (e.g., LAB pixel data) can be used as the luminance pixel data.

Figure 7:
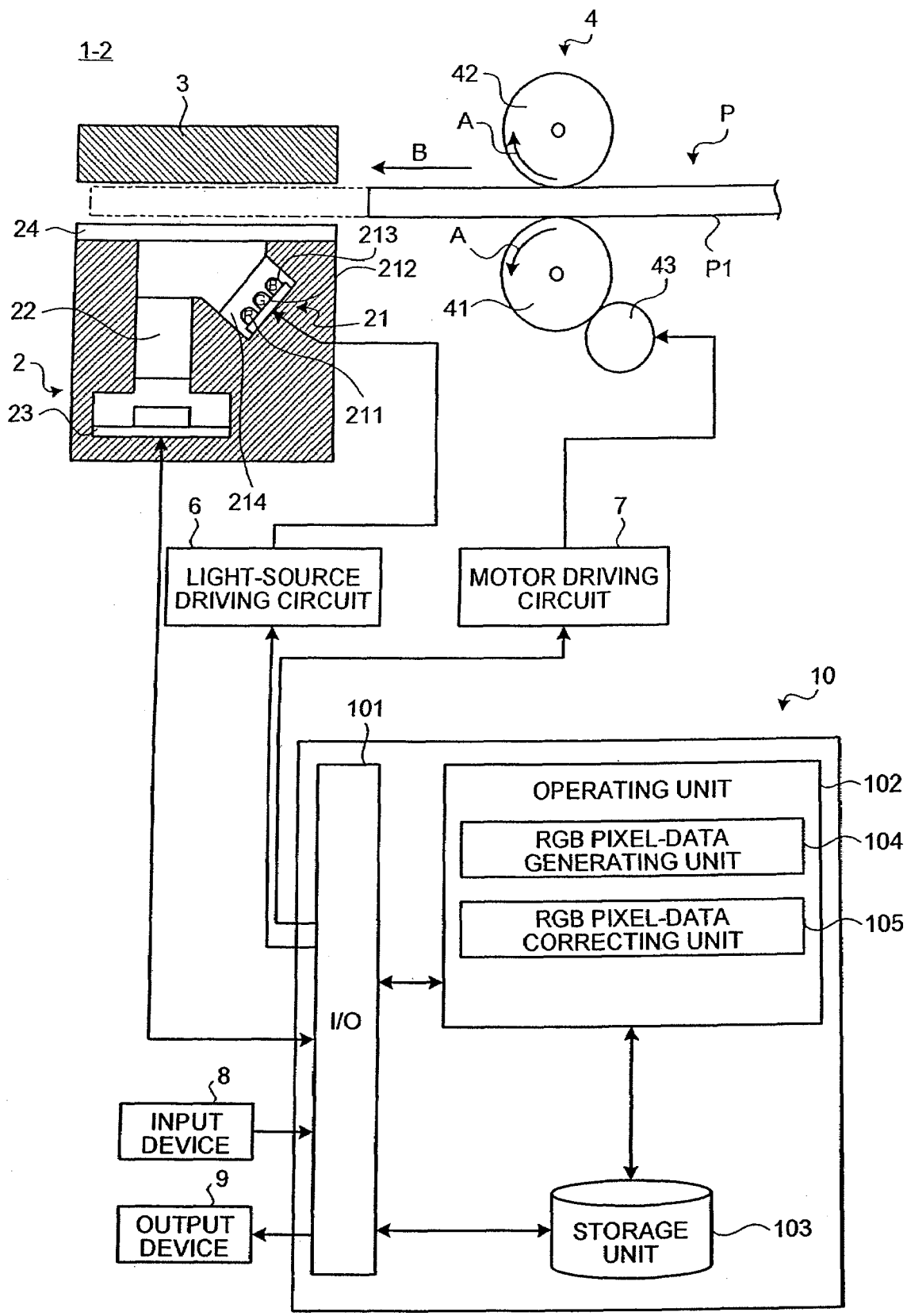
FIG. 7 is a schematic diagram of an image scanner according to a second embodiment of the present invention.

FIG. 7 is a schematic diagram of an image scanner 1-2 according to a second embodiment of the present invention. Unlike the image scanner 1-1 of the first embodiment, the image scanner 1-2 directly corrects reference RGB pixel data without converting the reference RGB pixel data into YUV pixel data. The image scanner 1-2 is of basically the same configuration as the image scanner 1-1 except a control unit 10. Like reference numerals refer to corresponding portions, and the same description is not repeated.

The image scanner 1-2 includes the control unit 10 that controls the functioning of the image scanner 1-2 for scanning a sheet. The control unit 10 generates RGB scanned-image data corresponding to the printed surface P1. The control unit 10 includes an input-output (I/O) unit 101, an operating unit 102, and a storage unit 103.

The operating unit 102 includes an RGB pixel-data generating unit 104 and an RGB pixel-data correcting unit 105. The RGB pixel-data generating unit 104 generates reference RGB pixel data corresponding to the printed surface P1.

The RGB pixel-data correcting unit 105 corrects the reference RGB pixel data by generating supplementary RGB pixel data corresponding to the OFF period of all the RGB light sources 211 to 213 within a single line period. In other words, within each line period, the supplementary RGB pixel data is generated based on the reference RGB pixel data in the same line period and the reference RGB pixel data in the next line period, i.e., the adjacent line period in the sub-scanning direction. Based on the supplementary RGB pixel data, the RGB pixel-data correcting unit 105 corrects the reference RGB pixel data to generate post-correction RGB pixel data.

Figure 8:
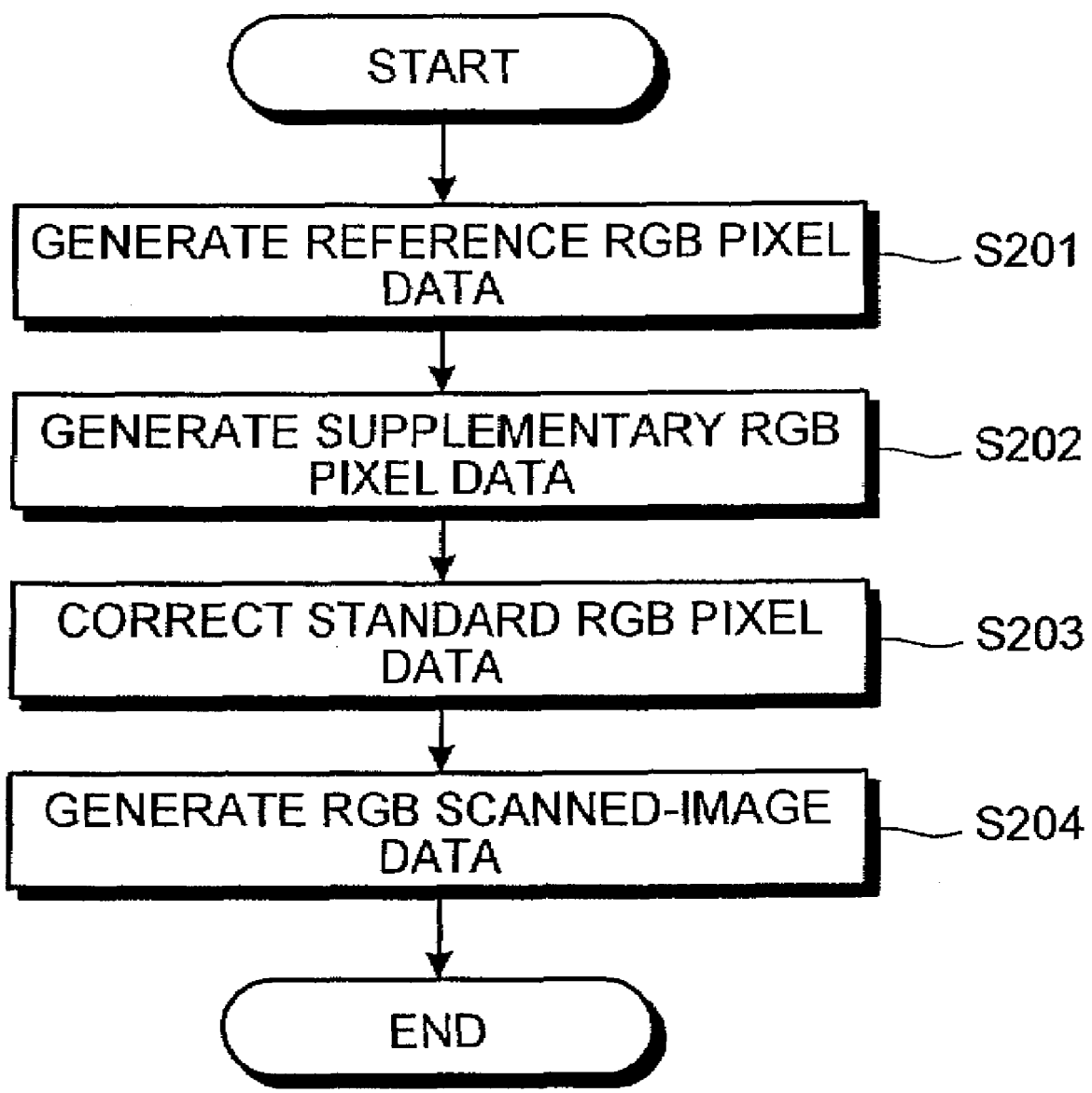
FIG. 8 is a flowchart of the operation of the image scanner shown in FIG. 7.
Figure 9:
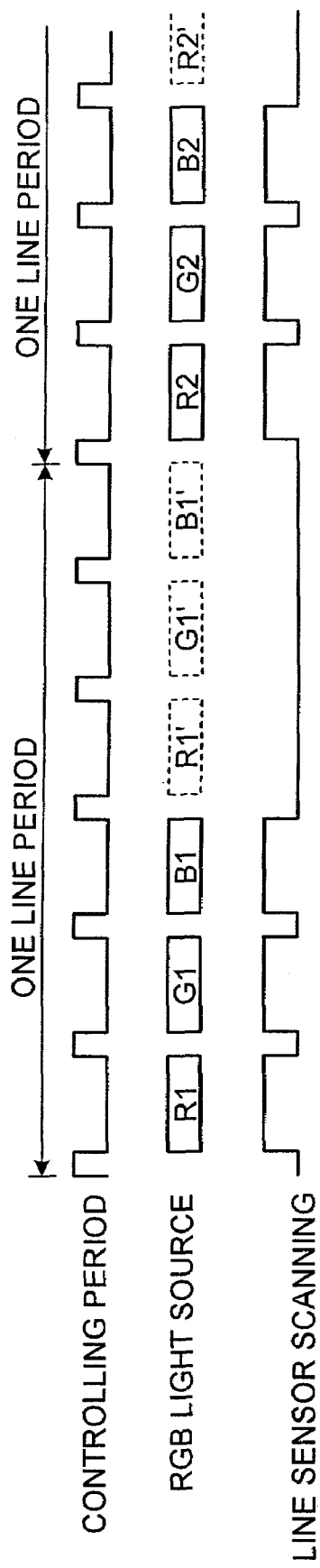
FIG. 9 is a timing chart for explaining the operation of each light source and an image sensor shown in FIG. 7.

FIG. 8 is a flowchart of the process of generating RGB scanned-image data based on supplementary RGB pixel data and reference RGB pixel data. FIG. 9 is a timing chart for explaining the operation of the RGB light sources 211 to 213 and the image sensor 23. The procedures in the following control flow identical to those according to the first embodiment are described in brief.

First, the RGB pixel-data generating unit 104 generates reference RGB pixel data (step S201).

The RGB pixel-data correcting unit 105 then generates supplementary RGB pixel data (step S202). More particularly, as shown in FIG. 9, corresponding to the ON period of each of the RGB light sources 211 to 213 within a first line period, the image sensor 23 first generates reference RGB pixel data that includes R1 line data, G1 line data, and B1 line data (hereinafter, "RGB1 line data") Similarly, corresponding to the OFF period of each of the RGB light sources 211 to 213 within the first line period, the image sensor 23 generates supplementary RGB pixel data that includes R1' line data, G1' line data, and B1' line data (hereinafter, "RGB1' line data"), as if the RGB light sources 211 to 213 are in ON state. In this way, within each line period, the image sensor 23 generates supplementary RGB pixel data corresponding to reference RGB pixel data in the same line period. As shown in FIG. 9, corresponding to the ON period of each of the RGB light sources 211 to 213 within a second line period, the image sensor 23 generates reference RGB pixel data that includes R2 line data, G2 line data, and B2 line data (hereinafter, "RGB2 line data"). In this case, the RGB' line data can be generated as, e.g., the average of the RGB1 line data and RGB2 line data (i.e., R1' line data=(R1+R2)/2 line data, G1' line data=(G1+G2)/2 line data, and B1' line data=(B1+B2)/2 line data).

After generating the supplementary RGB pixel data (step S202), the RGB pixel-data correcting unit 105 corrects the reference RGB pixel data based on the corresponding supplementary RGB pixel data to generate post-correction RGB pixel data (step S203). For example, the RGB pixel-data correcting unit 105 generates the post-correction RGB pixel data as the average of the RGB1 line data and the RGB' line data (i.e., (R1+R1')/2 line data, (G1+G1')/2 line data, and (B1+B1')/2 line data).

Based on the post-correction RGB pixel data, the control unit 10 generates RGB scanned-image data (step S204).

The image sensor 23 is not able to scan the printed surface P1 throughout a single line period because the ON period of the RGB light sources 211 to 213 is less than the single line period. In other words, the image sensor 23 is not able to scan the printed surface P1 during the OFF period of the RGB light sources 211 to 213 within a single line period. However, the missing scanning information corresponding to the OFF period can be obtained by generating the supplementary RGB pixel data. As a result, it is possible to generate smooth RGB scanned-image data based on the reference RGB pixel data and the supplementary RGB pixel data. Moreover, by omitting the process of converting the reference RGB pixel data into the YUV pixel data, it is possible to save the time required to generate the RGB scanned-image data.

Figure 10:
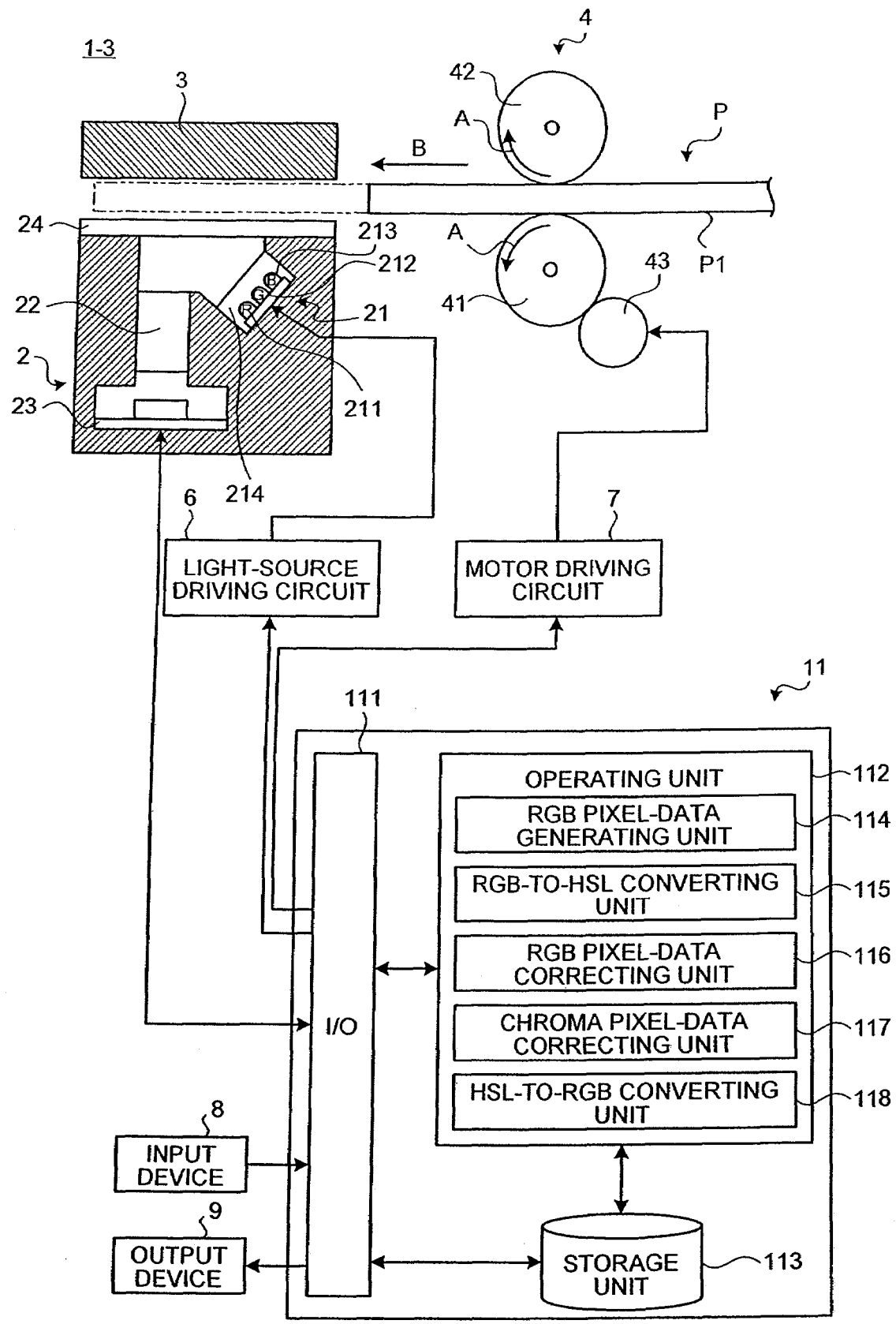
FIG. 10 is a schematic diagram of an image scanner according to a third embodiment of the present invention.

FIG. 10 is a schematic diagram of an image scanner 1-3 according to a third embodiment of the present invention. The image scanner 1-3 converts reference RGB pixel data into chroma pixel data that has at least a saturation component, and corrects the chroma pixel data. The image scanner 1-3 is of basically the same configuration as the image scanner 1-1 of the first embodiment except a control unit 11. Like reference numerals refer to corresponding portions, and the same description is not repeated.

The image scanner 1-3 includes the control unit 11 that controls the functioning of the image scanner 1-3 for scanning a sheet. The control unit 11 generates RGB scanned-image data corresponding to the printed surface P1. The control unit 11 includes an input-output (I/O) unit 111, an operating unit 112, and a storage unit 113.

The operating unit 112 includes an RGB pixel-data generating unit 114, an RGB-to-HSL converting unit 115, an RGB pixel-data correcting unit 116, a chroma pixel-data correcting unit 117, and an HSL-to-RGB converting unit 118. The RGB pixel-data generating unit 114 generates reference RGB pixel data corresponding to the printed surface P1.

The RGB-to-HSL converting unit 115 converts the reference RGB pixel data into chroma pixel data that has at least a saturation component. The chroma pixel data according to the third embodiment is assumed to be HSL pixel data (where H stands for hue, S stands for saturation, and L stands for luminance). Based on the RGB data in the reference RGB pixel data, the RGB-to-HSL converting unit 115 generates H component data regarding the hue component, S component data regarding the saturation component, and L component data regarding the luminance component to generate the HSL pixel data. Similarly, based on Ra data, Ga data, and Ba data in smoothed RGB pixel data (hereinafter, "RaGaBa pixel data") described later, the RGB-to-HSL converting unit 115 generates Ha component data regarding the hue component, Sa component data regarding the saturation component, and La component data regarding the luminance component to generate smoothed HSL pixel data (hereinafter, "HaSaLa pixel data"). Moreover, based on Rb data, Gb data, and Bb data in post-correction RGB pixel data (hereinafter, "RbGbBb pixel data") described later, the RGB-to-HSL converting unit 115 generates Hb component data regarding the hue component, Sb component data regarding the saturation component, and Lb component data regarding the luminance component to generate post-correction HSL pixel data (hereinafter, "HbSbLb pixel data"). Furthermore, based on Rc data, Gc data, and Bc data in re-smoothed post-correction RGB pixel data (hereinafter, "RcGcBc pixel data") described later, the RGB-to-HSL converting unit 115 generates Hc component data regarding the hue component, Sc component data regarding the saturation component, and Lc component data regarding the luminance component to generate re-smoothed post-correction HSL pixel data (hereinafter, "HcScLc pixel data").

The RGB pixel-data correcting unit 116 performs smoothing of the RGB data in the reference RGB pixel data. More particularly, the RGB pixel-data correcting unit 116 performs smoothing of the RGB data to generate the RaGaBa pixel data such that, e.g., scan-line misalignment corresponding to each of the R data, the G data, and the B data is not prominent. Moreover, the RGB pixel-data correcting unit 116 performs re-smoothing of the RbGbBb pixel data, which is generated by the HSL-to-RGB converting unit 118, based on, e.g., adjacent RGB pixel data to generate the RcGcBc data. That is, the RGB pixel-data correcting unit 116 performs re-smoothing of the Rb data, the Gb data, and the Bb data in the RbGbBb pixel data based on adjacent R data, adjacent G data, and adjacent B data, respectively, in adjacent post-correction RGB pixel data to generate the RcGcBc data including the Rc data, the Gc data, and the Bc data. For example, R data $R_n$ can be re-smoothed based on adjacent R data $R_{n-1}$ and $R_{n+1}$, G data $G_n$ can be re-smoothed based on adjacent G data $G_{n-1}$ and $G_{n+1}$, and B data $B_n$ can be re-smoothed based on adjacent B data $B_{n-1}$ and $B_{n+1}$, by using Expressions (3) to (5) as follows:

$$R_n = (f1 \times R_{n-1} + f2 \times R_n + f3 \times R_{n+1})/(f1+f2+f3) \quad (3)$$

$$G_n = (g1 \times G_{n-1} + g2 \times G_n + g3 \times G_{n+1})/(g1+g2+g3) \quad (4)$$

$$B_n = (h1 \times B_{n-1} + h2 \times B_n + h3 \times B_{n+1})/(h1+h2+h3) \quad (5)$$

where f1, f2, and f3 are weight parameters for the R data, g1, g2, and g3 are weight parameters for the G data, and h1, h2, and h3 are weight parameters for the B data.

In the case of smoothing the RGB pixel data by taking into consideration the scan-line misalignment, the weight parameters are set to logically match with one of the colors from among red, green, and blue. In the case of smoothing the RGB pixel data based on adjacent RGB pixel data, the weight parameters are set based on a rule of thumb to eliminate color non-uniformity and color fade-out.

The chroma pixel-data correcting unit 117 corrects the saturation component of the chroma pixel data. When a value of reference saturation component of reference chroma pixel data (reference HSL pixel data according to the third embodiment) is larger than a value of smoothed saturation component of smoothed chroma pixel data (HaSaLa pixel data according to the third embodiment), the chroma pixel-data correcting unit 117 replaces the reference saturation component by the smoothed saturation component. More particularly, according to the third embodiment, when the value of reference saturation component data (S data) of the reference HSL pixel data is larger than the value of smoothed saturation component data (Sa data) of the HaSaLa pixel data, the chroma pixel-data correcting unit 117 replaces the S data by the Sa data (S data=Sa data). Similarly, when a value of post-correction saturation component of post-correction chroma pixel data (the HbSbLb pixel data according to the third embodiment) is larger than a value of smoothed post-correction saturation component of smoothed post-correction chroma pixel data (the HcScLc pixel data according to the third embodiment), the chroma pixel-data correcting unit 117 replaces the post-correction saturation component by the smoothed post-correction saturation component. More particularly, according to the third embodiment, when the value of post-correction saturation component data (Sb data) of the HbSbLb pixel data is larger than the value of smoothed post-correction saturation component data (Sc data) of the HcScLc data, the chroma pixel-data correcting unit 117 replaces the Sb data by the Sc data (Sb data=Sc data).

The HSL-to-RGB converting unit 118 converts the reference HSL pixel data into the RbGbBb pixel data. More particularly, after the chroma pixel-data correcting unit 117 replaces the S data by the Sa data in the reference HSL pixel data, the HSL-to-RGB converting unit 118 generates the RbGbBb pixel data based on H data, the replaced Sa data, and L data of the reference HSL pixel data. On the other hand, when the chroma pixel-data correcting unit 117 does not correct the S data of the reference HSL pixel data, the HSL-to-RGB converting unit 118 generates the RbGbBb pixel data based on the H data, the S data, and the L data. Moreover, the HSL-to-RGB converting unit 118 converts the HbSbLb pixel data into another set of post-correction RGB pixel data. More particularly, after the chroma pixel-data correcting unit 117 replaces the Sb data by the Sc data in the HbSbLb pixel data, the HSL-to-RGB converting unit 118 generates post-correction RGB pixel data including Rd data, Gd data, and Bd data (hereinafter, "RdGdBd pixel data") based on Hb data, the replaced Sc data, and Lb data of the HbSbLb pixel data. On the other hand, when the chroma pixel-data correcting unit 117 does not correct the Sb data, the HSL-to-RGB converting unit 118 generates the RdGdBd pixel data based on the Hb data, the Sb data, and the Lb data. Based on the RdGdBd pixel data, the control unit 11 generates the RGB scanned-image data corresponding to the printed surface P1.

Figure 11:
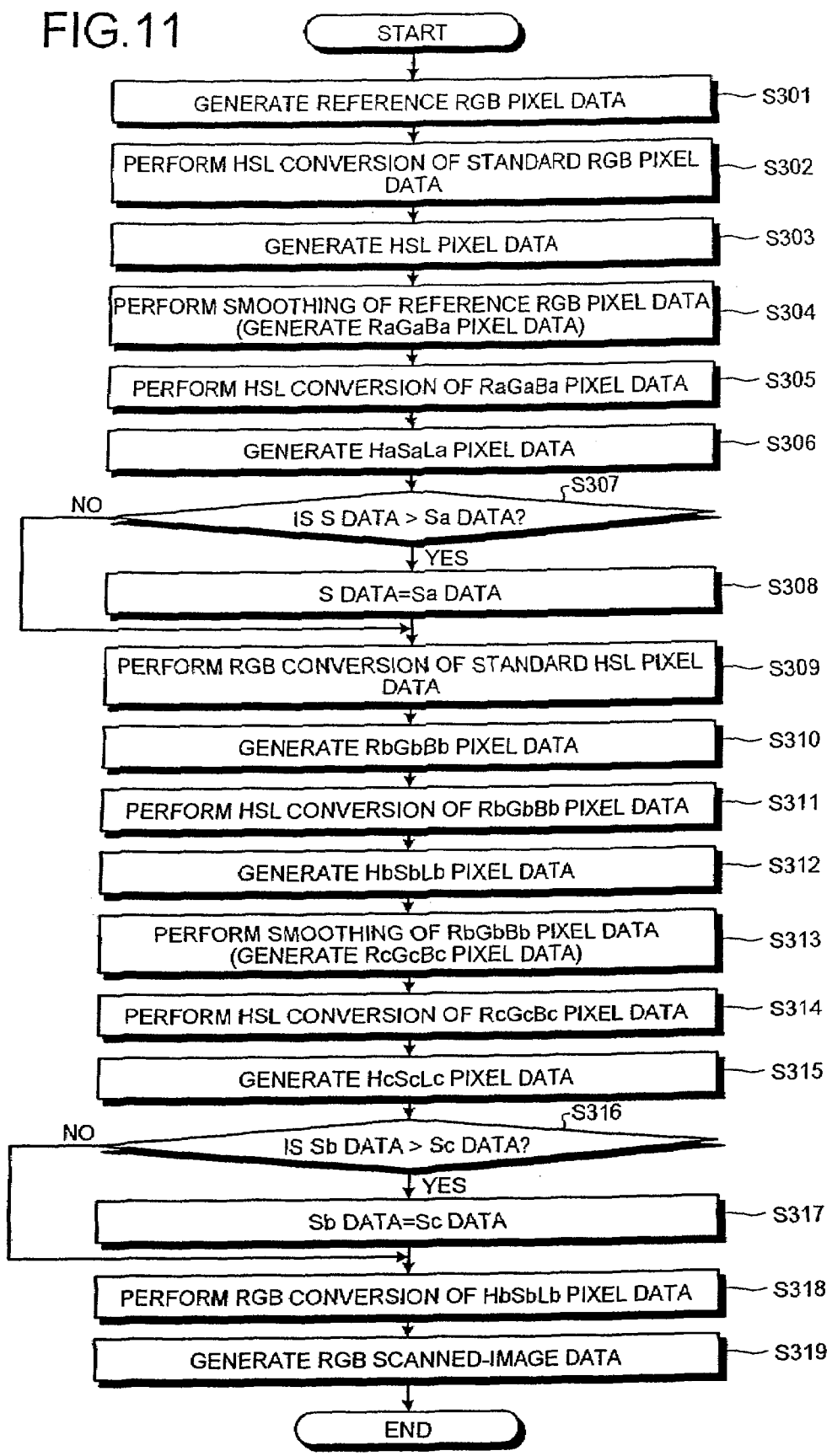
FIG. 11 is a flowchart of the operation of the image scanner according to the third embodiment.

FIG. 11 is a flowchart of the process of generating RGB scanned-image data of generating RGB scanned-image data by using HSL conversion. The procedures in the following control flow identical to those according to the first embodiment are described in brief.

First, the RGB pixel-data generating unit 114 generates reference RGB pixel data (step S301).

The RGB-to-HSL converting unit 115 performs HSL conversion of the reference RGB pixel data (step S302) to generate reference HSL pixel data (step S303).

The RGB pixel-data correcting unit 116 smoothes the reference RGB pixel data (step S304). More particularly, the RGB pixel-data correcting unit 116 performs smoothing of the RGB pixel data to generate RaGaBa pixel data by taking into consideration the scan-line misalignment.

The RGB-to-HSL converting unit 115 performs HSL conversion of the RaGaBa pixel data (step S305) to generate HaSaLa pixel data (step S306).

The chroma pixel-data correcting unit 117 then determines whether the value of the S data of the reference HSL pixel data is larger than the value of the Sa data of the HaSaLa pixel data (step S307).

When the value of the S data is larger than the value of the Sa data (YES at step S307), the chroma pixel-data correcting unit 117 corrects the reference HSL pixel data by replacing the Sa data for the S data such that the reference RGB pixel data is consequently corrected (step S308). On the other hand, when the value of the S data is not larger than the value of the Sa data (NO at step S307), the chroma pixel-data correcting unit 117 does not replace the S data by the Sa data.

The HSL-to-RGB converting unit 118 performs RGB conversion of the reference HSL pixel data, the S data of which is either replaced by the Sa data or maintained as it is (step S309), to generate RbGbBb pixel data (step S310).

The RGB-to-HSL converting unit 115 then performs HSL conversion of the RbGbBb pixel data (step S311) to generate HbSbLb pixel data (step S312).

The RGB pixel-data correcting unit 116 performs re-smoothing of the Rb data, the Gb data, and the Bb data in the RbGbBb pixel data based on the adjacent R data, the adjacent G data, and the adjacent B data, respectively, in adjacent post-correction RGB pixel data to generate RcGcBc pixel data including the Rc data, the Gc data, and the Bc data (step S313).

The RGB-to-HSL converting unit 115 then performs HSL conversion of the RcGcBc pixel data (step S314) to generate HcScLc pixel data (step S315).

The chroma pixel-data correcting unit 117 then determines whether the value of the Sb data of the HbSbLb pixel data is larger than the value of the Sc data of the HcScLc data (step S316).

When the value of the Sb data is larger than the value of the Sc data (YES at step S316), the chroma pixel-data correcting unit 117 corrects the HbSbLb pixel data by replacing the Sc data for the Sb data such that the RbGbBb pixel data is consequently corrected (step S317). On the other hand, when the value of the Sb data is not larger than the value of the Sc data (NO at step S316), the chroma pixel-data correcting unit 117 does not replace the Sb data by the Sc data.

The HSL-to-RGB converting unit 118 performs RGB conversion of the HbSbLb pixel data, the Sb data of which is either replaced by the Sc data or maintained as it is, to generate RdGdBd pixel data (step S318). The HSL-to-RGB converting unit 118 then generates RGB scanned-image data based on the RdGdBd pixel data (step S319).

Meanwhile, instead of the HSL pixel data, any other type of pixel data having a saturation component (e.g., HSV pixel data) can be used as the chroma pixel data.

As set forth hereinabove, according to an embodiment of the present invention, color non-uniformity is reduced cost-effectively, and less time is required for generating RGB scanned-image data.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
a light source unit that includes a plurality of light sources each corresponding to a different color, light sources being sequentially turned on once in a single line period to emit light of corresponding colors to irradiate a print medium with the light;
a sensor that includes an array of image sensing elements that read information from the print medium irradiated with the light to generate element data;
a generating unit that generates, based on the element data, first pixel data corresponding to the information; and
a carrier unit that carries the print medium with respect to the sensor to allow the sensor to read the information from the print medium in a sub-scanning direction, wherein
the single line period is equal to or more than twice a period from when first one of the light sources is turned on until last one of the light sources is turned off.

2. The image reading apparatus according to claim 1, further comprising:
a first converting unit that converts the first pixel data into luminance pixel data having a luminance component data and a color component;
a correcting unit that corrects the luminance pixel data based on at least one of the luminance component and the color component; and
a second converting unit that converts corrected luminance pixel data into second pixel data.

3. The image reading apparatus according to claim 2, wherein the correcting unit smoothes the color component based on a color component of luminance pixel data adjacent to the luminance pixel data in the sub-scanning direction.

4. The image reading apparatus according to claim 2, wherein the correcting unit corrects, when the color component has a small value, the color component to have a still smaller value.

5. The image reading apparatus according to claim 2, wherein the correcting unit smoothes the luminance component.

6. The image reading apparatus according to claim 1, further comprising a correcting unit that, based on the first pixel data and pixel data adjacent to the first pixel data in the sub-scanning direction, generates supplementary pixel data corresponding to a period for which all the light sources are turned off in the single line period, and corrects the first pixel data based on the supplementary pixel data to generate second pixel data.

7. The image reading apparatus according to claim 1, further comprising:
a first correcting unit that smoothes the first pixel data to obtain smoothed pixel data;
a first converting unit that converts the first pixel data into chroma pixel data having at least a first saturation component, and the smoothed pixel data into smoothed chroma pixel data having at least a second saturation component;
a second correcting unit that, when a value of the first saturation component is larger than a value of the second saturation component, replaces the first saturation component by the second saturation component; and
a second converting unit that converts the chroma pixel data into second pixel data.

8. The image reading apparatus according to claim 7, wherein
the first correcting unit performs re-smoothing of the second pixel data to obtain second smoothed pixel data,
the first converting unit converts the second pixel data into second chroma pixel data having at least a third saturation component, and the second smoothed pixel data into second smoothed chroma pixel data having at least a fourth saturation component,
the second correcting unit replaces the third saturation component by the fourth saturation component when a value of the third saturation component is larger than a value of the fourth saturation component, and
the second converting unit converts the second chroma pixel data into third pixel data.

9. A method of controlling an image reading apparatus comprising:
sequentially turning on a plurality of light sources, each corresponding to a different color, once in a single line period to emit light of corresponding colors to irradiate a print medium with the light;
reading information from the print medium irradiated with the light to generate element data by a sensor that includes an array of image sensing elements;
generating, based on the element data, first pixel data corresponding to the information; and
carrying the print medium with respect to the sensor to allow the sensor to read the information from the print medium in a sub-scanning direction, wherein
the single line period is equal to or more than twice a period from when first one of the light sources is turned on until last one of the light sources is turned off.

* * * * *